(12) United States Patent  
Visker

(10) Patent No.: US 8,057,853 B2  
(45) Date of Patent: Nov. 15, 2011

(54) METHOD FOR APPLYING A CURED COVERING LAYER ON A SUBSTRATE

(75) Inventor: Antonius Cornelis H. M. Visker, KE Breda (NL)

(73) Assignee: Visker Beheer B.V., Breda (NL)

( * ) Notice: Subject to any disclaimer, the term of this patent is extended or adjusted under 35 U.S.C. 154(b) by 557 days.

(21) Appl. No.: 10/581,806

(22) PCT Filed: Dec. 3, 2004

(86) PCT No.: PCT/NL2004/000846  
§ 371 (c)(1), (2), (4) Date: Apr. 17, 2007

(87) PCT Pub. No.: WO2005/053934  
PCT Pub. Date: Jun. 16, 2005

(65) Prior Publication Data  
US 2007/0296110 A1  Dec. 27, 2007

(30) Foreign Application Priority Data  
Dec. 3, 2003 (NL) .................................... 1024933

(51) Int. Cl.  
*B05D 5/10* (2006.01)  
*B29C 63/02* (2006.01)  
*D06N 7/00* (2006.01)

(52) U.S. Cl. ................. 427/207.1; 427/208.6; 427/412; 427/412.1

(58) Field of Classification Search .... 427/207.1–208.8, 427/243, 245, 407.1, 411, 412, 412.1–412.5; 428/40.1, 41.7, 41.8, 43  
See application file for complete search history.

(56) References Cited

U.S. PATENT DOCUMENTS

| | | | | | |
|---|---|---|---|---|---|
| 3,161,554 | A | * | 12/1964 | Blackford | ...................... 156/242 |
| 3,837,960 | A | * | 9/1974 | Renn et al. | ...................... 156/253 |
| 4,413,621 | A | * | 11/1983 | McCracken et al. | ............ 602/52 |
| 5,160,315 | A | * | 11/1992 | Heinecke et al. | ................ 602/57 |
| 5,520,629 | A | * | 5/1996 | Heinecke et al. | ................ 602/57 |
| 6,682,757 | B1 | * | 1/2004 | Wright | ......................... 424/448 |

FOREIGN PATENT DOCUMENTS

| | | | |
|---|---|---|---|
| EP | 0573676 | A | 12/1993 |
| GB | 1458444 | | 12/1976 |
| JP | 60-011338 | A * | 1/1985 |
| JP | 60011338 | A | 1/1985 |
| JP | 02-034680 | A * | 2/1990 |
| JP | 2000-345124 | A * | 12/2000 |
| WO | WO 2004/092240 | A1 * | 10/2004 |

* cited by examiner

*Primary Examiner* — William Phillip Fletcher, III  
(74) *Attorney, Agent, or Firm* — Bozicevic, Field & Francis LLP; Bret E. Field

(57) ABSTRACT

Provided are methods for applying a covering layer to a substrate, including applying an adhesive layer in non-cross-linked state to the substrate and applying thereto a cross-linked covering layer, characterized in that the covering layer is provided with openings, and methods for manufacturing a coating package, and using the coating package.

12 Claims, 3 Drawing Sheets

METHOD FOR APPLYING A CURED COVERING LAYER ON A SUBSTRATE

The present invention relates to a method for applying a covering layer to a substrate, to a method for manufacturing a coating package, to a coating package which can be obtained using this method, to a coating package and to the use of the coating package.

When applying a covering layer, such as a decorative layer or protective layer, to a substrate, such as for instance when painting houses, use is usually made of liquid coating preparations, such as for instance paints and lacquers. However, this has a great number of drawbacks.

Firstly, use is made in most coating preparations of organic solvents. These solvents are harmful to the health of the processing person. The use of organic solvents is further harmful to the environment. Governments are therefore seeking to limit the use thereof.

Another drawback of the use of liquid coating preparations is that careful application thereof takes a relatively long time. Another factor here is that it often takes a long time before the layer applied to the substrate is cured.

In addition, all sorts of contaminants can enter the coating preparation when it is applied to a substrate outside. These can include dust, sand, rain or dew moisture. An additional drawback is that when the coating layer applied to the substrate does not dry quickly, people can brush against it with their clothing, or that draught strips or rebates become stained with the coating preparation.

In the European patent specification EP 0573 676 a method is described wherein a substrate, such as for instance a wooden substrate, is coated with an already partly cross-linked lacquer layer. The drawback of the use of this lacquer layer is that air is enclosed during application thereof to a substrate. An aesthetically less attractive product is hereby obtained. An additional drawback is that when a substrate is coated with the partly cross-linked lacquer layer, the moisture remains in the substrate. This inclusion of moisture has a negative effect on both the lifespan of the substrate and on the applied lacquer layer.

It is an object of the present invention to obviate the above stated drawbacks.

According to a first aspect of the invention, this object is achieved with a method for applying a covering layer to a substrate, comprising of applying an adhesive layer in non-cross-linked state to the substrate and applying thereto a cross-linked covering layer, characterized in that the covering layer is provided with openings.

The cross-linked state is understood to mean the state from the moment the covering layer is dust-dry and can be handled. This state is such that the covering layer can be separated from a carrier without the covering layer disintegrating. The adhesive layer further preferably consists of adhesive agent which is applied to the substrate. This adhesive agent for instance makes it possible to bind the covering layer to the substrate, an example of such an adhesive agent is so-called primer.

The openings in the covering layer are preferably applied by means of a laser. It is however also possible to provide the covering layer with openings using mechanical and/or chemical means. The openings in the covering layer preferably comprise perforations. The openings in the covering layer can have a substantially round shape, but may also have the shape of a cut. Depending on the quantity of the adhesive layer which is applied, the openings in the covering layer are filled with the material of the non-cross-linked adhesive layer. The method according to the present invention offers a large number of advantages compared to a method wherein use is made of a liquid coating preparation or of a partly cross-linked lacquer layer which is not provided with perforations. A first advantage of said method is that the inclusion of air between the covering layer and the substrate is prevented, whereby an aesthetically attractive product is obtained. Another advantage is that the inclusion of moisture in the substrate is avoided. The lifespan of the substrate and of the covering layer applied to the substrate is hereby lengthened considerably. Compared to the method wherein use is made of a liquid coating preparation, the present invention has the further advantage that the cross-linked covering layer is already prepared in advance in a conditioned area, whereby the emission of hydrocarbons can be intercepted so that they do not affect the processing person or enter the environment.

A high quality of the covering layer can also be achieved by preparing the covering layer in a conditioned area. The cross-linked covering layer can further be applied relatively quickly to the substrate. Nor is there is any longer the risk of contaminants entering the covering layer. Finally, the staining of people's clothing, draught strips and rebates is also avoided.

It is recommended that the openings have a size between 5 μm and 100 μm. An optimal passage of air and moisture is obtained at such a size of the openings.

The adhesive layer is preferably applied to the covering layer before the assembly of adhesive layer and covering layer is applied to the substrate. It is further recommended that the covering layer and/or the adhesive layer comprises a paint layer. In a preferred embodiment of the present invention, the covering layer comprises a loose or woven fibre product. The advantage hereof is that a covering layer is obtained which can withstand outside influences very well. The fibre product preferably comprises glass or synthetic fibres.

It is further recommended that the side of the covering layer which comes into contact with the adhesive layer and/or the adhesive layer itself is provided with spacers for holding the covering layer at a predetermined distance relative to the substrate. The advantage hereof is that the covering layer is situated at the same distance from the substrate over the whole surface area of the substrate. This increases the aesthetic value of the whole. The spacers are preferably formed integrally with the covering layer. This can be achieved for instance by providing a side of the covering layer with a relief pattern.

It is furthermore recommended to provide the covering layer and/or the adhesive layer with an additive. The whole hereby becomes more elastic and so easier to process.

A second aspect of the invention relates to a method for manufacturing a coating package, comprising of providing a flat, flexible carrier and applying at least one covering layer to the carrier, wherein the covering layer is cross-linked on the carrier, characterized in that the covering layer is provided with openings.

Cross-linking of the covering layer on the carrier is understood to mean cross-linking of the covering layer itself, such that the covering layer is dust-dry and can be handled so that it does not disintegrate when it is separated from the carrier.

The openings in the covering layer preferably have a size between 5 μm and 100 μm. This is so that an optimal passage of air and moisture is obtained at such a size of the openings. It is further recommended that the covering layer comprises a paint layer. In a preferred embodiment the flat, flexible carrier comprises a paint-repellent layer. The advantage hereof is that the covering layer can be easily separated from the carrier so that it can be applied to a substrate in simple manner.

The carrier further preferably comprises a loose or woven fibre product. The carrier can further also be of plastic or paper. The carrier can however also remain connected to the covering layer so that when the whole is arranged in an adhesive layer on a substrate, the carrier forms part of the coating system. It is then particularly recommended that the carrier comprises a loose or woven fibre product. The fibre product then preferably comprises glass fibres or synthetic fibres. The advantage hereof is that a covering layer/carrier system is obtained on the substrate which can withstand outside influences very well.

It is further recommended to provide the covering layer with spacers. The advantage hereof is that when the covering layer is applied to a substrate, the covering layer is situated at the same distance from the substrate over the whole surface area of the substrate. This enhances the aesthetic value of the whole. The spacers are preferably formed integrally with the covering layer. This can be achieved for instance by providing a side of the covering layer with a relief pattern. It is further recommended that the covering layer comprises an elasticizing additive. The whole hereby becomes more elastic and therefore easier to process.

A third aspect of the present invention relates to a coating package obtainable according to the above stated method.

A fourth aspect relates to a coating package comprising a flat, flexible carrier to which is applied at least one covering layer in cross-linked state, characterized in that the covering layer is provided with openings. The advantage of arranging openings in the covering layer is that no air is enclosed when the covering layer is applied to the substrate, whereby the aesthetic value of the whole is enhanced. An additional advantage is that when the substrate is damp, the moisture can pass through the covering layer to the environment, whereby the lifespan of the substrate and of the covering layer are increased.

The openings in the covering layer preferably have a size between 5 μm and 100 μm. This is because an optimal passage of air and moisture is obtained at such a size of the openings.

It is further recommended that the covering layer comprises a paint layer. The carrier preferably comprises a paint-repellent layer. The carrier can hereby be separated from the covering layer simply and quickly.

The flat, flexible carrier preferably comprises a loose or woven fibre product, such as for instance glass fibres or synthetic fibres. This is particularly recommended when the carrier is not separated from the covering layer and the whole is thus placed in the adhesive layer on the substrate. In this manner a covering layer is obtained which can withstand outside influences very well.

The covering layer is preferably provided with spacers. The advantage hereof is that when the covering layer is applied to a substrate, the covering layer is situated at the same distance from the substrate over the entire surface area of the substrate. This increases the aesthetic value of the whole. The spacers are preferably formed integrally with the covering layer. This can be achieved for instance by providing a side of the covering layer with a relief pattern.

In a preferred embodiment the covering layer is provided with an elasticizing additive. The whole hereby becomes more elastic and so easier to process.

A fifth aspect of the present invention relates to a method for applying a covering layer to a substrate, comprising of providing a coating package as described above, at least partly separating the covering layer from the carrier, applying an adhesive layer in non-cross-linked state to the substrate and applying the covering layer thereto, characterized in that the covering layer is provided with openings. In this manner a substrate can be coated relatively quickly and precisely without air or moisture being enclosed.

A sixth aspect of the present invention relates to the use of the above described coating package in the coating of buildings, such as for instance the window frames and doors of a building.

A seventh aspect of the present invention relates to a method for applying a covering layer to a substrate, comprising of applying an adhesive layer in non-cross-linked state to the substrate and applying a cross-linked covering layer thereto, characterized in that the covering layer and/or the adhesive layer is provided with spacers. The advantage of the use of such spacers is that when the covering layer is applied to a substrate, the covering layer is situated at the same distance from the substrate over the entire surface area of the substrate. This enhances the aesthetic value of the whole. The spacers are preferably formed integrally with the covering layer. This can be achieved for instance by providing a side of the covering layer with a relief pattern.

An eighth aspect of the present invention relates to a method and/or a coating package according to any of the claims 1-12, wherein the distance A corresponds to the distance between the substrate and the upper side of the covering layer, and has a value between 0.01 and 0.1 mm.

The distance A is preferably between 0.01 and 0.05 mm.

Stated and other features of the present invention will be further elucidated hereinbelow on the basis of a number of exemplary embodiments, which are only given by way of example without the invention being deemed limited thereto. Reference is herein made to the annexed drawings, in which.

Figure 1:
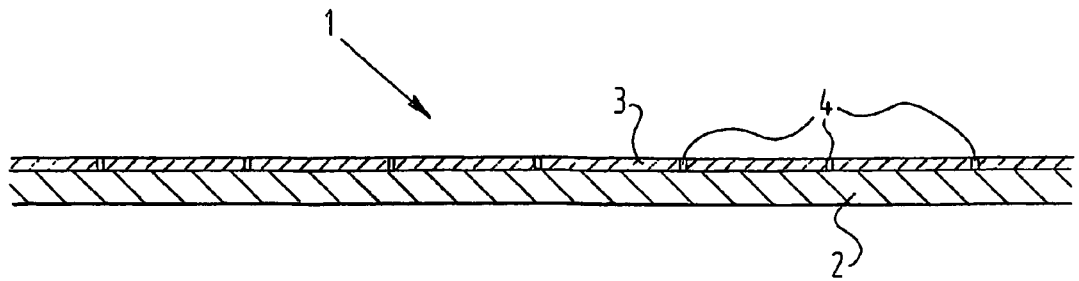
FIG. 1 shows a schematic side view of a coating package according to a preferred embodiment of the present invention.

FIG. 1 shows a coating package 1 for coating a substrate. Coating package 1 comprises a flat, flexible carrier 2. A covering layer 3 of paint is applied to carrier 2. This covering layer 3 is already in cross-linked state, so that it can be separated from carrier 2 without the covering layer falling apart. In order to facilitate separation of carrier 2 and covering layer 3, carrier 2 is provided with a paint-repellent layer. Covering layer 3 is provided with openings 4 for the purpose of preventing the inclusion of air when the covering layer is applied to a substrate.

Figure 2:
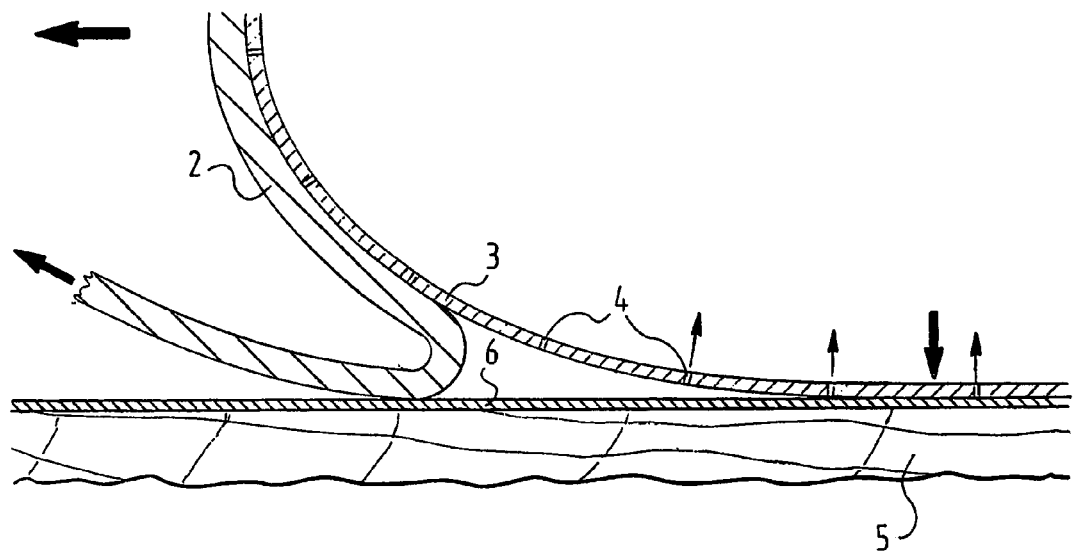
FIG. 2 shows a schematic side view of a covering layer which is applied to a substrate.

FIG. 2 shows the application of covering layer 3 of FIG. 1 to a substrate 5. Covering layer 3 is here partly separated from carrier 2. Substrate 5 is provided with an adhesive layer 6 to which the covering layer 3 separated from carrier 2 is adhered. Openings 4 ensure that no air is enclosed during adhesion of covering layer 3 to adhesive layer 6 and substrate 5. A product is thus obtained with a high aesthetic value.

Figure 3:
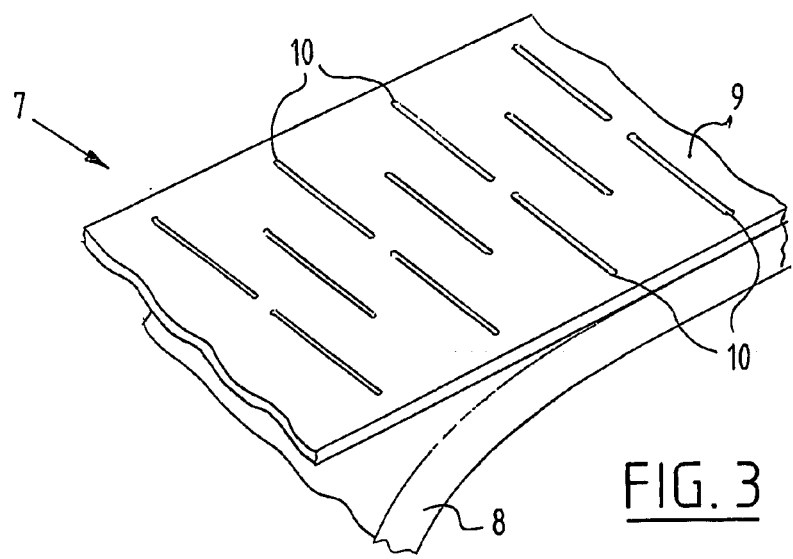
FIG. 3 shows a view of a coating package according to a preferred embodiment of the present invention which is provided with cuts.

FIG. 3 shows a coating package 7 which comprises a carrier 8 to which a covering layer 9 (preferably paint) is applied. The openings in covering layer 9 take the form of a cut 10. The advantage of such a form is that when covering layer 9 is adhered to a substrate, cuts 10 are filled with adhesive from the adhesive layer. A good connection between the covering layer and the adhesive layer/substrate can thus be obtained.

Figure 4:
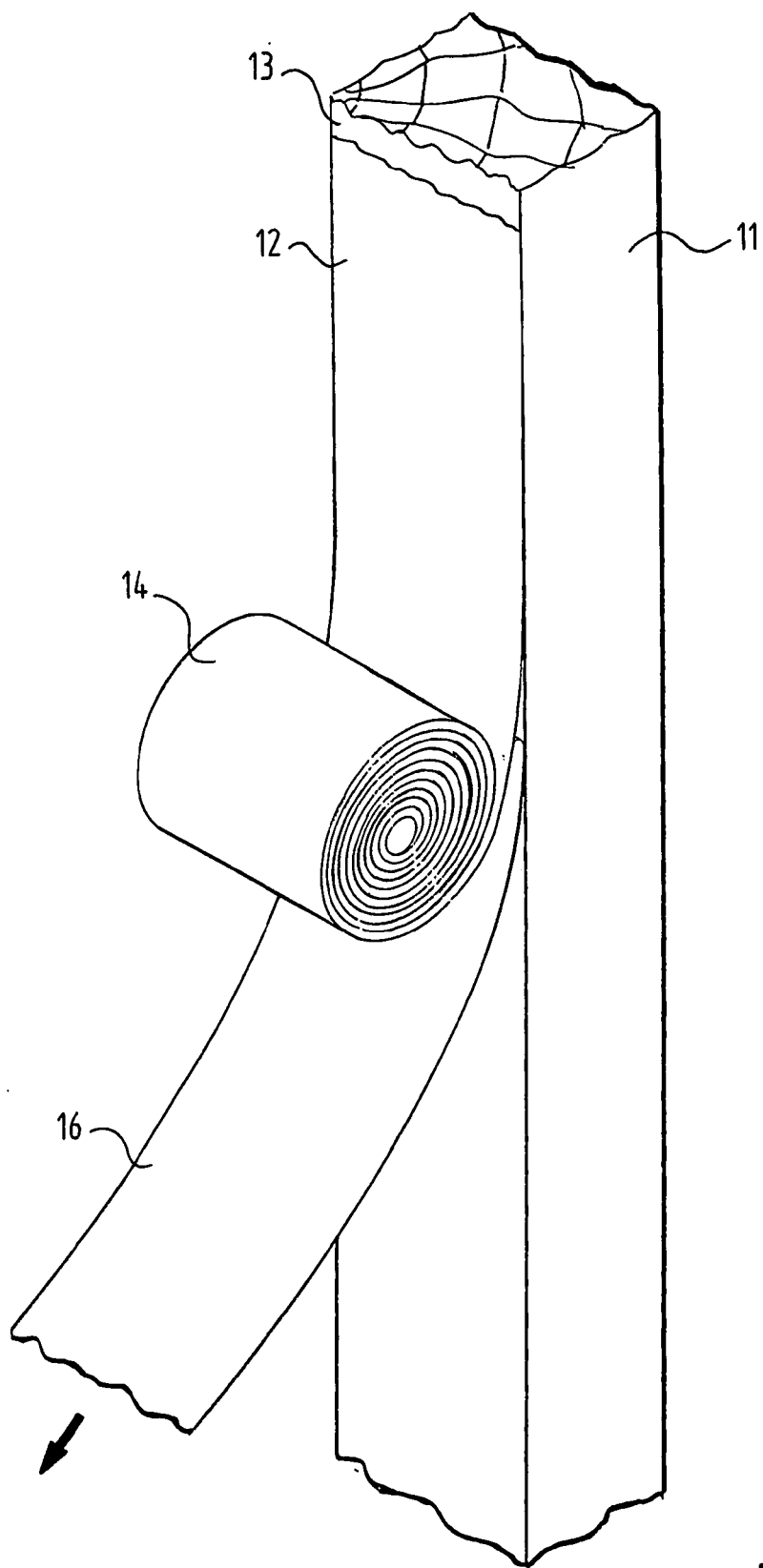
FIG. 4 shows a view of a substrate partly provided with a covering layer.

FIG. 4 shows a substrate 11 to which a covering layer 12 is applied. Substrate 11 is provided with an adhesive layer 13 for adhering the covering layer 12 to the substrate. Covering layer 13 is situated partly on a roll 14. On this roll 14 the covering layer 13 is still situated on carrier 15. Covering layer 13 is separated from carrier 15 as covering layer 13 is applied to substrate 11.

Figure 5:
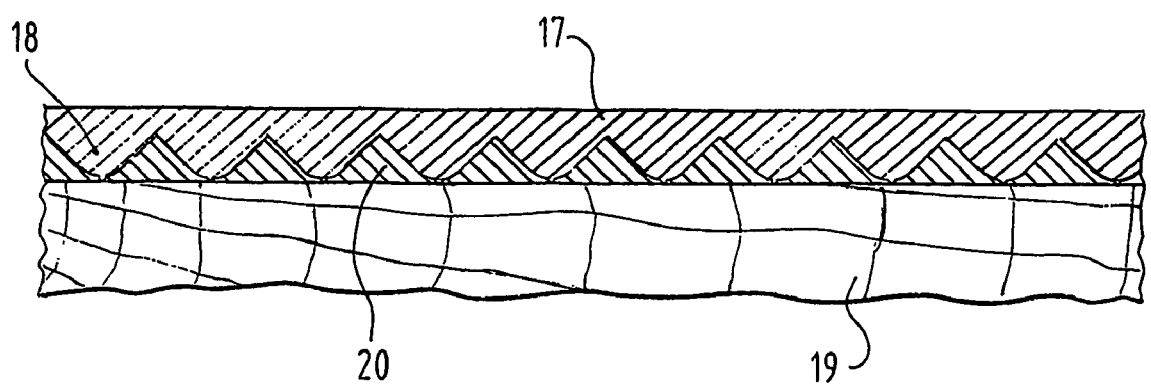
FIG. 5 shows a side view of a covering layer which is applied to a first coat.

FIG. 5 shows a covering layer 17, preferably of paint, which is provided with spacers 18. Spacers 18 are formed integrally with covering layer 17. Covering layer 17 is applied to a substrate 19, which is provided with an adhesive layer 20. Because covering layer 17 is provided with spacers 18, the upper side of covering layer 17 is situated the same distance from the upper side of substrate 19 over the entire surface area of substrate 19. An aesthetically very attractive product is obtained in this manner. Before covering layer 17 was applied to the substrate, it was adhered to a carrier which had a complementary form.

The invention claimed is:

1. A method for applying a covering layer to a substrate, the method comprising:
   providing a coating package comprising:
      a flat, flexible carrier;
      a covering layer, wherein the covering layer is cross-linked on the carrier, and
      wherein the covering layer comprises openings,
         wherein the carrier comprises a layer configured to attach to and separate from the covering layer;
   at least partly separating the carrier from the covering layer;
   applying an adhesive layer in a non-cross-linked state between the covering layer and a substrate; and
   applying the covering layer to the substrate;
   wherein at least one of the covering layer and the adhesive layer is a paint layer.

2. The method as claimed in claim 1, wherein the adhesive layer is applied to the covering layer before applying the covering layer to the substrate.

3. The method as claimed in claim 1, wherein at least one of the covering layer and the adhesive layer comprises an elasticizing additive.

4. The method as claimed in claim 1, wherein a distance A is defined which corresponds to the distance between the upper side of the substrate and the upper side of the covering layer, and wherein the distance A has a value ranging from 0.01 mm to 1 mm.

5. The method as claimed in claim 4, wherein the distance A has a value ranging from 0.01 to 0.1 mm.

6. A method for applying a covering layer to a substrate comprising:
   providing a coating package comprising:
      a flat, flexible carrier;
      a covering layer, wherein the covering layer is cross-linked on the carrier, and
      wherein the covering layer comprises openings,
         wherein the carrier comprises a layer configured to attach to and separate from the covering layer;
   at least partly separating the carrier from the covering layer;
   applying an adhesive layer in a non-cross-linked state between the covering layer and a substrate; and
   applying the covering layer to the substrate;
   wherein at least one of the covering layer and the carrier comprises a loose or woven fiber product.

7. The method as claimed in claim 6, wherein the fiber product comprises glass or synthetic fibers.

8. A method for applying a covering layer to a substrate comprising:
   providing a coating package comprising:
      a flat, flexible carrier;
      a covering layer, wherein the covering layer is cross-linked on the carrier, and
      wherein the covering layer comprises openings,
         wherein the carrier comprises a layer configured to attach to and separate from the covering layer;
   at least partly separating the carrier from the covering layer;
   applying an adhesive layer in a non-cross-linked state between the covering layer and a substrate; and
   applying the covering layer to the substrate;
   wherein the coating package further comprises spacers for holding the covering layer at a predetermined distance relative to the substrate.

9. The method as claimed in claim 8, wherein the spacers are positioned at one or more of the following: on a side of the covering layer which comes into contact with the adhesive layer, in the adhesive layer, and on the adhesive layer.

10. The method as claimed in claim 8, wherein the spacers are configured such that they are formed integrally with the covering layer.

11. A method for applying a covering layer to a substrate comprising:
   providing a coating package comprising:
      a flat, flexible carrier;
      a covering layer, wherein the covering layer is cross-linked on the carrier, and
      wherein the covering layer comprises openings,
         wherein the carrier comprises a layer configured to attach to and separate from the covering layer;
   at least partly separating the carrier from the covering layer;
   applying an adhesive layer in a non-cross-linked state between the covering layer and a substrate; and
   applying the covering layer to the substrate;
   wherein the method is a method for applying a coating to a surface of a building.

12. The method as claimed in claim 11, wherein the surface comprises a window frame or a door.

* * * * *